US012782651B2

United States Patent

(12) United States Patent
Wang et al.

(10) Patent No.: US 12,782,651 B2
(45) Date of Patent: Nov. 3, 2026

(54) OPTICAL ASSEMBLY, PHOTOELECTRIC MODULE AND MOUNTING METHOD, PLUG AND ACTIVE CABLE

(71) Applicant: EverPro (Wuhan) Technologies Company Limited, Wuhan (CN)

(72) Inventors: Qunze Wang, Wuhan (CN); Hui Jiang, Beijing (CN); Xiaolong Guo, Wuhan (CN); Jinlong Huang, Wuhan (CN); Kang Tian, Wuhan (CN)

(73) Assignee: EVERPRO (WUHAN) TECHNOLOGIES COMPANY LIMITED, Wuhan (CN)

( * ) Notice: Subject to any disclaimer, the term of this patent is extended or adjusted under 35 U.S.C. 154(b) by 281 days.

(21) Appl. No.: 18/648,477

(22) Filed: Apr. 29, 2024

(65) Prior Publication Data

US 2024/0418947 A1 Dec. 19, 2024

(30) Foreign Application Priority Data

Jun. 19, 2023 (CN) ......................... 202310722081.5

(51) Int. Cl.
*G02B 6/42* (2006.01)

(52) U.S. Cl.
CPC .................................. *G02B 6/4214* (2013.01)

(58) Field of Classification Search
CPC .................................................... G02B 6/4214
See application file for complete search history.

(56) References Cited

U.S. PATENT DOCUMENTS

2014/0099058 A1* 4/2014 Charbonneau-Lefort .................. G02B 6/4284 385/33
2020/0287629 A1* 9/2020 Han ....................... H04B 10/40

FOREIGN PATENT DOCUMENTS

| | | | |
|---|---|---|---|
| CN | 108508553 | A | 9/2018 |
| CN | 111142201 | A | 5/2020 |
| CN | 111665599 | A | 9/2020 |
| CN | 112835151 | A | 5/2021 |
| CN | 215769133 | U * | 2/2022 |
| CN | 114384644 | A | 4/2022 |
| CN | 216772050 | U | 6/2022 |
| CN | 217587686 | U | 10/2022 |
| WO | 2022267805 | A1 | 12/2022 |

OTHER PUBLICATIONS

Translation of CN215769133U (Year: 2022).*
(Continued)

*Primary Examiner* — Chad H Smith
(74) *Attorney, Agent, or Firm* — Kilpatrick Townsend & Stockton LLP

(57) ABSTRACT

The application discloses an optical assembly, a photoelectric module and a mounting method, a plug and an active cable, and belongs to the field of optical fiber connectors. The optical assembly comprises a body, and a reflecting surface, an opening and a lens arranged on the body. The opening and the lens are both arranged on one side of the reflecting surface along a first direction, and meanwhile, the opening comprises an inner wall, the lens is arranged on the inner wall of the opening, the opening faces the first direction and a second direction, and the second direction is different from the first direction.

13 Claims, 3 Drawing Sheets

(56) References Cited

OTHER PUBLICATIONS

The first office action received in the corresponding Chinese Application 202310722081.5, mailed Nov. 30, 2023.
The second office action received in the corresponding Chinese Application 202310722081.5, mailed Mar. 8, 2024.
The first search report received in the corresponding Chinese Application 202310722081.5, mailed Nov. 30, 2023.
The supplementary search report received in the corresponding Chinese Application 202310722081.5, mailed Mar. 8, 2024.

* cited by examiner

OPTICAL ASSEMBLY, PHOTOELECTRIC MODULE AND MOUNTING METHOD, PLUG AND ACTIVE CABLE

CROSS-REFERENCES TO RELATED APPLICATIONS

This application claims the priority of Chinese Patent Application 202310722081.5 filed on Jun. 19, 2023, the disclosure of which is incorporated herein by reference.

TECHNICAL FIELD

The present application belongs to the technical field of photoelectric modules, and in particular, to an optical assembly, a photoelectric module and a mounting method, a plug and an active cable.

BACKGROUND

With the advent of the information age, an information technology has influenced and changed people's mode of production and lifestyle, and an information transmission technology has become an important driving force for modern economic development. A communication transmission technology has penetrated into all aspects of people's work and life and social economy. Under this technical background, efficient transmission and miniaturization of equipment have become the development trend of existing photoelectric modules.

Existing optical emitter or optical receiver is usually arranged on a carrier plate. The optical emitter emits optical signals perpendicular to the carrier plate, and the optical receiver receives light perpendicular to the carrier plate. The optical emitter and the optical receiver realize light coupling through two lenses and one reflecting surface. Usually, one of the optical emitter or the optical receiver is an optical fiber, and the optical fiber itself is soft, so an additional fixing bracket is needed to fix the optical fiber. The fixing bracket fixes the optical fiber and then fixes the optical fiber with the reflecting surface structure to ensure accuracy of a light transmission direction. The existing photoelectric module structure is bulky, and is difficult to adapt to miniaturization and ultra-thin development trend of electronic products. Moreover, the design structure of the existing photoelectric module makes it necessary to adjust relative positions of the fixing bracket, the reflecting surface and the optical fiber before each assembly, which greatly increases assembly time of the photoelectric module.

SUMMARY

Aiming at one or more of the above defects or improvement requirements of the prior art, an optical assembly provided by the embodiments of the present application is used to realize miniaturization of the optical assembly and adapt to driving chips and photoelectric assemblies with different models and sizes; and improve mounting efficiency of an optical fiber and the optical assembly, and improve a utilization rate of a photoelectric module.

To achieve the above objects, the present application provides an optical assembly, which comprises:

a body, and a reflecting surface, an opening and a lens arranged on the body;

the opening and the lens are both arranged on one side of the reflecting surface along a first direction;

the opening comprises an inner wall, and the lens is arranged on the inner wall of the opening; and the opening faces the first direction and a second direction, and the second direction is different from the first direction.

As a further improvement of the present application, the body is provided with a counter bore at one side of the reflecting surface along the second direction, the reflecting surface is opposite to the counter bore along the second direction, and a rear focus of the lens coincides with an image of a closed end of the counter bore in the reflecting surface.

As a further improvement of the present application, the opening further comprises a side wall extending along the first direction; and the opening comprises a blocking member extending towards the first direction, and the blocking member is arranged on one side of the lens facing away from a surface of the side wall.

As a further improvement of the present application, an included angle between the reflecting surface and an axis direction of the counter bore is 45°.

As a further improvement of the present application, the body is pervious to light at least on light transmission paths from the counter bore to the reflecting surface and from the lens to the reflecting surface.

As a further improvement of the present application, the counter bore comprises a fixing portion and a stop portion coaxially arranged in sequence along the second direction, the stop portion is arranged at the closed end of the counter bore, and a projection area of the stop portion along the second direction is smaller than a projection area of the fixing portion along the second direction.

As a further improvement of the present application, the counter bore further comprises a guide portion, the guide portion is adjacent to the fixing portion, the stop portion is located at one end of the fixing portion, the guide portion is located at the other end of the fixing portion, the projection area of the fixing portion along the second direction is smaller than a projection area of the guide portion along the second direction, and the fixing portion comprises a truncated cone transition section with an inner diameter gradually increasing towards the guide portion.

As a further improvement of the present application, the optical assembly comprises a plurality of the lenses and a plurality of the counter bores; and the plurality of the lenses are arranged in one-to-one correspondence with the plurality of the counter bores, and the rear focus of each the lens of the plurality of the lenses arranged opposite to each other coincides with the image of the closed end of the counter bore in the reflecting surface.

As a further improvement of the present application, the body comprises a notch, and at least part of the notch is recessed towards the first direction to form the reflecting surface.

As a further improvement of the present application, the body comprises an optical alignment point, and the optical alignment point is arranged on the body along the first direction.

The present application further comprises a photoelectric module, which comprises the optical assembly, a photoelectric assembly and a carrier plate;

a transceiver port of the photoelectric assembly faces the lens; and the optical assembly and the photoelectric assembly are both arranged on the carrier plate.

The carrier plate seals the opening along the first direction.

As a further improvement of the present application, the transceiver port of the photoelectric assembly coincides with a anterior focus of the lens.

As a further improvement of the present application, one side of the body facing the carrier plate is provided with a placement groove along the second direction, the carrier plate abuts against the placement groove along the second direction, and the placement groove at least partially coincides with the carrier plate along the first direction.

As a further improvement of the present application, a driving chip is further comprised, and the driving chip is connected with the photoelectric assembly; and the driving chip is arranged on the carrier plate and located in the opening, and at least part of the driving chip extends out of the opening along the second direction.

As a further improvement of the present application, the driving chip and the photoelectric assembly are arranged at intervals.

As a further improvement of the present application, the driving chip and the photoelectric assembly are arranged at intervals, the photoelectric assembly is located at one side of the driving chip, and the carrier plate is located at the other side of the driving chip.

As a further improvement of the present application, one side of the body facing the driving chip further comprises a glue blocking plate, the glue blocking plate is connected with the inner wall of the body, and the glue blocking plate abuts against the driving chip.

As a further improvement of the present application, the driving chip is covered with glue, and the glue seals the opening along the second direction.

As a further improvement of the present application, the notch comprises a baffle, and the baffle covers the reflecting surface.

The present application further comprises a plug, which comprises the above-mentioned optical module and a connector, the connector is electrically connected with the carrier plate, and the connector is used for being electrically connected with an external device.

The present application further comprises an active cable, which comprises two plugs, and the two plugs are connected by an optical fiber.

The present application further comprises a photoelectric module mounting method used for mounting the above-mentioned photoelectric module, wherein the method comprises the following steps:

- selecting an optical assembly, a carrier plate, a photoelectric assembly and a driving chip;
- placing the photoelectric assembly at a preset position of the carrier plate and placing the driving chip;
- placing the optical assembly at the preset position of the carrier plate, and aligning a lens of the optical assembly with a transceiver port of the photoelectric assembly along a first direction; and
- sealing an interval between the driving chip and the optical assembly along the first direction with glue.

As a further improvement of the present application, before the sealing the interval between the driving chip and the optical assembly along the first direction with glue, the method further comprises the following steps:

- observing an alignment condition between the optical assembly and a preset point on the carrier plate through an optical alignment point, and judging a deviation between the optical alignment point and the preset point on the carrier plate; and
- when the deviation between the optical alignment point and the preset point on the carrier plate is greater than a standard deviation threshold, readjusting a position of the optical assembly on the carrier plate.

As a further improvement of the present application, before the sealing the interval between the driving chip and the optical assembly along the first direction with glue, the method further comprises the following first step or second step:

- the first step comprises: arranging an optical fiber on one side of the reflecting surface along a second direction; controlling, by the driving chip, the photoelectric assembly to emit optical signals, which are converged by the lens, reflected by the reflecting surface and transmitted to an end of the optical fiber to test an optical power received by the optical fiber; and readjusting the position of the optical assembly on the carrier plate when the optical power received by the optical fiber is less than a standard optical signal receiving intensity; and
- the second step comprises: arranging an optical fiber at one side of the reflecting surface along the second direction, and arranging an optical emitter at one end of the optical fiber facing away from the reflecting surface; emitting, by the optical emitter, optical signals, which are transmitted to the reflecting surface through the optical fiber and reflected to the lens, and converged by the lens, and transmitted to the transceiver port of the photoelectric assembly, to test an optical power received by the photoelectric assembly; and readjusting the position of the optical assembly on the carrier plate when the optical power received by the photoelectric assembly is less than the standard optical signal receiving intensity.

The above improved technical features can be combined with each other as long as they do not conflict with each other.

In general, the above technical solutions conceived by the embodiments of the present application can achieve the following beneficial effects compared with the prior art.

(1) In the optical assembly of the embodiments of the present application, the opening is provided at one side of the lens facing away from the reflecting surface, so that when the optical assembly is assembled with the photoelectric assembly and the driving chip, the driving chip can correspondingly extend out of the optical assembly through the opening, so that a volume of the optical assembly is not limited by volumes of the driving chip and the photoelectric assembly, and the volume of the optical assembly is reduced. Meanwhile, the mounting of the driving chip is not limited by an accommodating region, which is convenient for the position adjustment of the driving chip and the photoelectric assembly, so that the optical assembly can adapt to driving chips and photoelectric assemblies with different models and sizes, an applicable scene of the optical assembly is greatly improved, and an overall manufacturing cost and design cost of the photoelectric module are reduced.

(2) In the optical assembly of the embodiments of the present application, an original fixing bracket structure of the optical fiber is omitted, the optical fiber is fixed by opening the counter bore on the body, and the lens and the reflecting surface are directly arranged on the body, so that an optical transmission direction of the optical fiber and the photoelectric assembly is fixed by the optical assembly, and the mounting efficiency of the photoelectric module is greatly improved. Meanwhile, because the optical assembly itself fixes the optical fiber through the counter bore, reflects the optical signals through the reflecting surface, and converges the optical signals through the lens, the original optical fiber fixing bracket, the reflecting surface, the lens, and the like are gathered together, and the miniaturization of the photoelectric module is realized.

(3) In the optical assembly of the embodiments of the present application, the body is arranged, and the counter bore, the reflecting surface and the lens are gathered inside the body, and an optical path between the optical fiber and the photoelectric assembly is realized by the body, and the body itself realizes the alignment of the reflecting surface, the lens and the counter bore, which omits the step of adjusting and aligning the positions of the optical fiber, the reflecting surface and the lens separately when the existing photoelectric module is mounted, and improves the mounting efficiency of the photoelectric module.

(4) In the optical assembly of the embodiments of the present application, the plurality of the lenses and the plurality of the counter bores are arranged along a third direction, so that a single photoelectric module can realize optical signal transmission between a plurality of pairs of optical fibers and the photoelectric assembly, and a utilization rate of the photoelectric module is improved.

(5) In the optical assembly of the embodiments of the present application, the counter bore is arranged in a multi-section form, and sizes of the stop portion and the fixing portion are defined, so that the optical fiber can be fixed by the fixing portion, and cladding of the optical fiber just abuts on a platform surface formed by the stop portion and the fixing portion, so that a core layer of the optical fiber is unable to contact with a wall surface of the body when an end of the optical fiber is fixed by the stop portion, thus avoiding a damage of the core layer of the optical fiber caused by abutting on the body.

(6) In the optical assembly of the embodiments of the present application, the blocking member is arranged at the opening of the body, and a distance between the body and the driving chip along the first direction is shortened by the blocking member, so that when the blocking member and the driving chip are packaged by glue, an amount of glue can be correspondingly reduced, packaging efficiency can be improved, and excessive glue can be prevented from overflowing to the photoelectric assembly to cover the transceiver port, thus avoiding a problem that the glue affects a transceiving performance of the photoelectric assembly.

BRIEF DESCRIPTION OF THE DRAWINGS

In all the drawings, the same reference numeral indicates the same technical feature, specifically.

Figure 1:
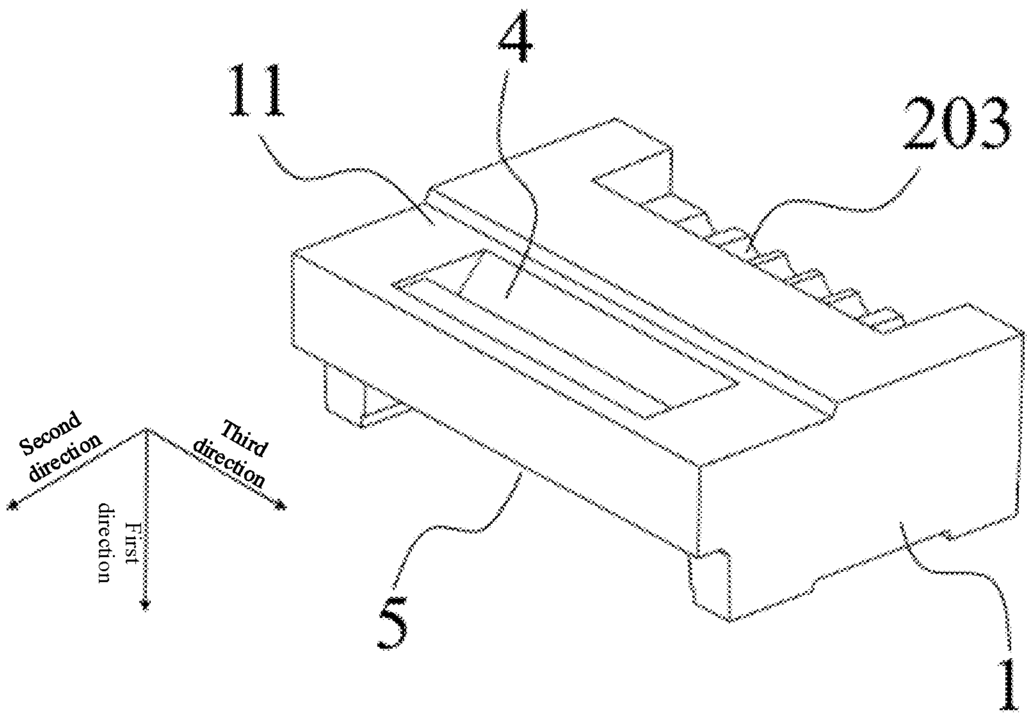
FIG. 1 is a schematic diagram of an overall structure of an optical assembly in some embodiments of the present application.

1 refers to body; 2 refers to counter bore; 3 refers to lens; 4 refers to reflecting surface; 5 refers to opening; 6 refers to photoelectric assembly; 7 refers to driving chip; 8 refers to carrier plate; 9 refers to baffle; 10 refers to blocking member; 11 refers to notch; 12 refers to optical alignment point; and 13 refers to fixing surface of blocking member; and

201 refers to stop portion; 202 refers to fixing portion; and 203 refers to guide portion.

DETAILED DESCRIPTION OF THE EMBODIMENTS

To make the objects, technical solutions, and advantages of the present application clearer, the following further describes some embodiments of the present application in detail with reference to the drawings and embodiments. It should be understood that the specific embodiments described herein are only used to explain the present application, but are not intended to limit the present application. In addition, the technical features involved in various embodiments of the present application described below can be combined with each other as long as they do not constitute conflicts with each other.

In the description of the present application, it should be understood that the orientation or positional relationships indicated by the terms "center", "longitudinal", "transversal", "length", "width", "thickness", "up", "down", "front", "back", "left", "right", "vertical", "horizontal", "top", "bottom", "inside", "outside", "clockwise", "anticlockwise", "axial", "radical", "circumferential" and the like are orientation or positional relationships based on the drawings, which are only for convenience and simplification of the description of the present application, but are not intended to indicate or imply that the indicated device or element must have a specific orientation, be constructed and operated in a specific orientation, and thus, cannot be understood as a limitation to the present application.

Moreover, the terms "first" and "second" are only used for descriptive purposes, but cannot be understood as indicating or implying relative importance, or implicitly indicating the number of indicated technical features. Therefore, the features defined with "first" and "second" can explicitly or implicitly comprise at least one of the features. In the description of the present application, the meaning of "multiple" is two or more than two, such as two, three, and the like, unless otherwise specifically defined.

In the description of the present application, unless expressly stipulated and defined otherwise, terms such as "installation", "connected", "connection", "fixing", and the like, should be understood broadly, for example, the connection may be fixed connection, or detachable connection or integral connection; may be mechanical connection, and may also be electrical connection; and may be direct connection, may also be indirect connection through an intermediate medium, and may also be internal communication of two elements or interaction relationship of two elements, unless otherwise explicitly defined. The specific meaning of the above terms in the present application can be understood in a specific case by those of ordinary skills in the art.

In the present application, unless expressly stipulated and defined otherwise, the first feature "on" or "under" the second feature may be that the first and second features are in direct contact, or the first and second features may be indirectly through an intermediate medium. Moreover, the first feature "above", "over" and "upper" the second feature may be that the first feature is directly above or diagonally above the second feature, or it simply means that a height of the first feature is higher than the second feature. The first feature "below", "under" and "lower" the second feature may be that the first feature is directly below or diagonally below the second feature, or it simply means that the height of the first feature is less than that of the second feature.

EMBODIMENTS

Referring to FIGS. 1 to 6, an optical assembly in the present application comprises a body 1, and a light reflecting surface 4, an opening 5 and a lens 3 arranged on the body 1. Specifically, the opening 5 and the lens 3 are both arranged on one side of the reflecting surface 4 along a first direction, and the opening 5 comprises an inner wall, the lens 3 is arranged on the inner wall of the opening 5, and meanwhile, the opening 5 faces the first direction and a second direction, and the first direction is different from the second direction.

The first direction, the second direction and a third direction in the present application are marked in FIG. 1. The first direction is a direction from the reflecting surface 4 to the lens 3, the second direction is a major axis direction of the counter bore 2, the third direction is perpendicular to the first direction and the third party is also perpendicular to the second direction. As an example, the third direction is a direction perpendicular to a principal plane in FIG. 2. Alternatively, a plurality of the lenses 3 are arranged side by side along the third direction.

In an optical assembly structure of the prior art, a mounting bracket is usually provided to mount a photoelectric assembly 6, a driving chip 7 and the like. The lens 3 is arranged on the mounting bracket, the photoelectric assembly 6 is placed at the lens 3, and the photoelectric assembly 6 is correspondingly connected with the driving chip 7. In order to ensure stability of signal transmission, the photoelectric assembly 6 and the driving chip 7 are hermetically mounted in an accommodating area of the lens 3. With the increase of a signal transmission rate, volumes of the driving chip 7 and the photoelectric assembly 6 also increase, and a required area of the accommodating region increases, which in turn leads to the increase of the volume of the optical assembly.

The embodiments of the present application provide an optical assembly. A body of the optical assembly comprises a lens 3, a reflecting surface 4 and an opening 5. By arranging the opening 5 at one side of the lens 3 facing away from the reflecting surface 4, the lens 3 communicates with an external space through the opening 5, so that when the optical assembly is connected with the photoelectric assembly 6 and the driving chip 7 in a matching way, the driving chip 7 can extend out of the optical assembly through the opening 5. By setting the opening 5, an accommodation space for the photoelectric assembly 6 and the driving chip 7 is increased, so that the optical assembly can adapt to the photoelectric assembly 6 and the driving chip 7 with different sizes. Meanwhile, the opening 5 enables positions of the driving chip 7 and the photoelectric assembly 6 to be adjusted correspondingly. By adjusting the positions of the driving chip 7 and the photoelectric assembly 6, a length of a gold wire connecting the driving chip 7 and the photoelectric assembly 6 is reduced. A parasitic inductance of the gold wire may affect the signal transmission in the photoelectric module. The shorter the length of the gold wire is, the smaller the parasitic inductance is. By reducing the length of the gold wire between the driving chip 7 and the photoelectric assembly 6, an influence of the gold wire on the signal transmission in the photoelectric module can be significantly reduced.

Specifically, in one embodiment of the present application, the opening 5 faces the first direction and the second direction, and the extension of the opening 5 in the first direction and the second direction makes the opening form the accommodating region at the lens 3 for accommodating the photoelectric assembly 6 and the driving chip 7. Moreover, the opening 5 allows the driving chip 7 to extend out of the opening 5, so that even if the size of the photoelectric assembly 6 and/or the driving chip 7 is larger than the opening 5, the photoelectric assembly and/or driving chip can be used in cooperation with the optical assembly according to the embodiment of the present application. Alternatively, the first direction and the second direction may be perpendicular to each other or at other angles. The inner wall of the opening 5 is a plane where the lens 3 is located, and a side wall of the opening 5 is a wall perpendicular to the plane where the lens 3 is located.

Further, the body 1 in the present application is provided with a counter bore 2 at one side of the reflecting surface 4 along the second direction, and a rear focus of the lens 3 coincides with an image of a closed end of the counter bore 2 in the reflecting surface 4. A traditional photoelectric module is provided with a connection structure or plug-in structure on a mounting bracket to fix an end face of an optical fiber at a focus of a lens, so that the optical fiber and a photoelectric assembly (for example, VCSEL/Lens/LED) can transmit optical signals with each other. In the present application, the body 1 is provided with the counter bore 2, and the optical fiber is mounted and fixed by the counter bore 2. An end face of the optical fiber extending into the body 1 substantially coincides with the closed end of the counter bore 2. Moreover, the rear focus of the lens 3 coincides with the image of the closed end of the closed end 2 in the reflecting surface 4, so that the optical fiber inserted in the counter bore 2 can transmit signals with the photoelectric assembly 6. Here, the closed end of the counter bore 2 is the front end of the counter bore 2 towards the reflecting surface 4. In the art, the side where the photoelectric assembly 6 is located is generally regarded as an object side, and the side of the lens 3 facing away from the photoelectric assembly 6 is regarded as an image side. The lens 3 has a anterior focus f1 and a rear focus f2.

In an alternative embodiment, a window of the photoelectric assembly 6 is generally located at the anterior focus f1, and the image of the end face of the counter bore 2 on the reflecting surface 4 generally coincides with the rear focus f2.

Alternatively, in practice, there may be some deviation in a position of the optical fiber inserted in the counter bore 2, which does not need accurate positioning. Because a diameter of the optical fiber is between an optical window and a photosensitive surface of the photoelectric assembly 6, and a diameter of the lens is much larger than a diameter of the optical fiber, the optical signals emitted by the photoelectric assembly 6 are converged by the lens 3, and a converging point after being reflected by the reflecting surface 4 meets an incident angle of the optical fiber. The optical signals emitted by the optical fiber are reflected by the reflecting surface 4, and then converged on the photosensitive surface of the photoelectric assembly 6 through the lens 3.

Figure 3:
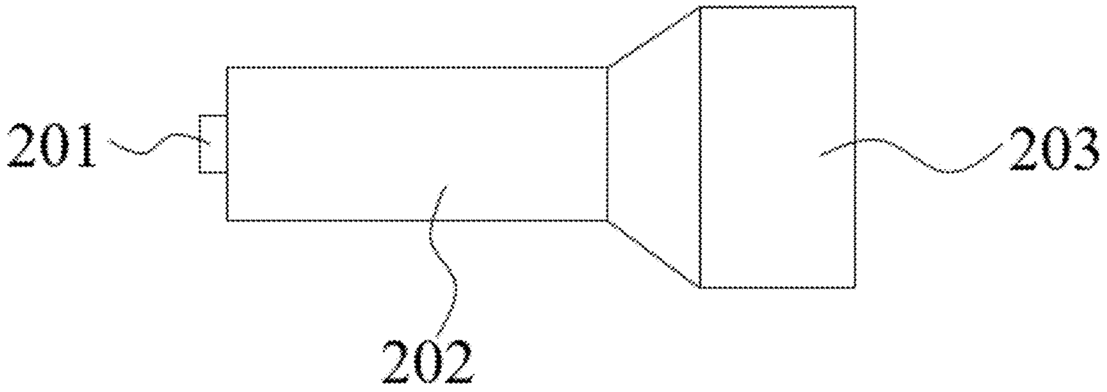
FIG. 3 is a schematic structural diagram of a counter bore in some embodiments of the present application.
Figure 4:
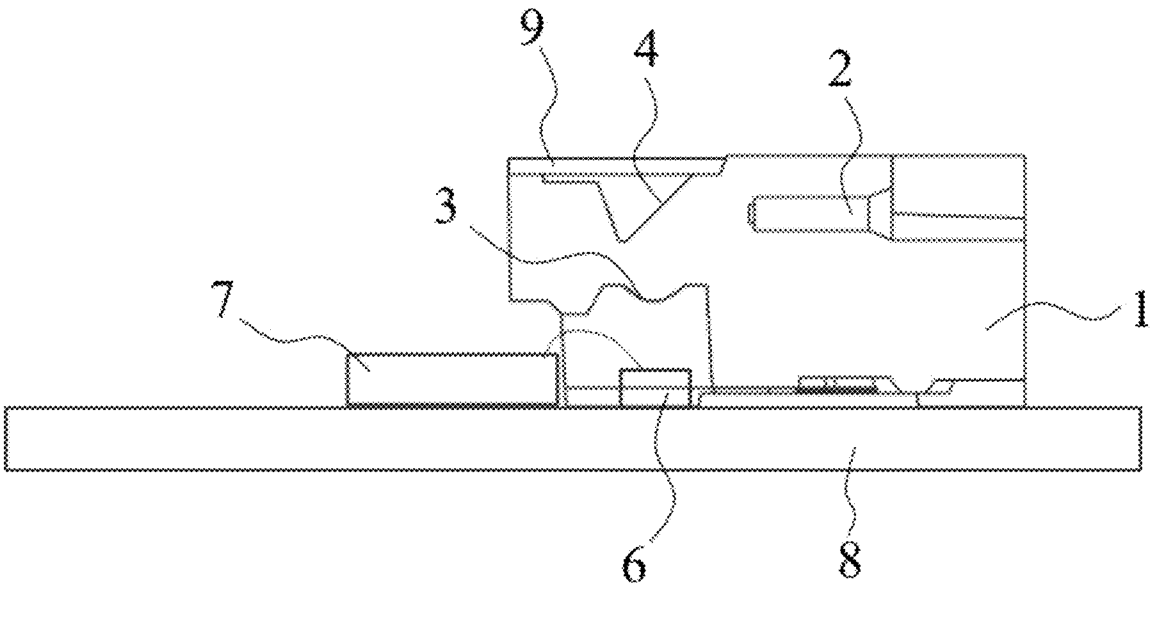
FIG. 4 is a schematic structure diagram of a photoelectric module in some embodiments of the present application.

Preferably, the counter bore 2 comprises a stop portion 201 and a fixing portion 202 coaxially arranged in sequence along the second direction. The stop portion 201 is arranged at the closed end of the counter bore 2, and a projection area of the stop portion 201 along the second direction is smaller than a projection area of the fixing portion 202 along the second direction, as shown in FIG. 3. According to the present application, the counter bore 2 is set to be a coaxially disposed multi-section structure, the optical fiber is fixed by the fixing portion 202, and meanwhile, the end of the optical fiber is abutted by a stepped structure formed by the stop portion 201 and the fixing portion 202, so that a position of the end of the optical fiber is ensured, and at the same time, the end of the counter bore 2 is prevented from touching a core layer of the optical fiber to cause damage to the core layer of the optical fiber. Preferably, the stop portion 201 and the fixing portion 202 are in a circular hole structure as a whole to match a cylindrical structure of the optical fiber. Meanwhile, a size of the stop portion 201 is smaller than an outer diameter of the optical fiber and larger than an outer diameter of the core layer of the optical fiber, so that the core layer of the optical fiber will not be connected with the stepped structure, and the damage when the core layer contacts the body 1 is avoided.

Further preferably, the counter bore 2 further comprises a guide portion 203, and the guide portion 203 is arranged adjacent to the fixing portion 202. The stop portion 201 is located at one end of the fixing portion 202, the guide portion 203 is located at the other end of the fixing portion 202, and the projection area of the fixing portion 202 along the second direction is smaller than a projection area of the guide portion 203 along the second direction. The fixing portion 202 comprises a truncated cone transition section with an inner diameter gradually increasing towards the guide portion 203. Due to the small size of the optical fiber, the fixing portion 202 is used for fixing the optical fiber. The size of the fixing portion 202 is adapted to the size of the optical fiber, which makes the optical fiber difficult to align the optical fiber with a circular hole of the fixing portion 202 when the optical fiber penetrates into the fixing portion 202. Based on this, the guide portion 203 is correspondingly provided in the present application. For example, the projection area of the guide portion 203 along the second direction is larger than the projection area of the fixing portion 202 along the second direction. By arranging the truncated cone transition section between the guide portion 203 and the fixing portion 202, the optical fiber conveniently put into the guide portion 203 can easily slide into the fixing portion 202. Specifically, the guide portion 203 may be adjusted according to the structure of the optical assembly. Particularly the guide portion 203 may have a circular hole structure or, the guide portion 203 have a partially broken structure along the first direction, so that the optical fiber can be quickly inserted into the fixing portion 202.

Figure 2:
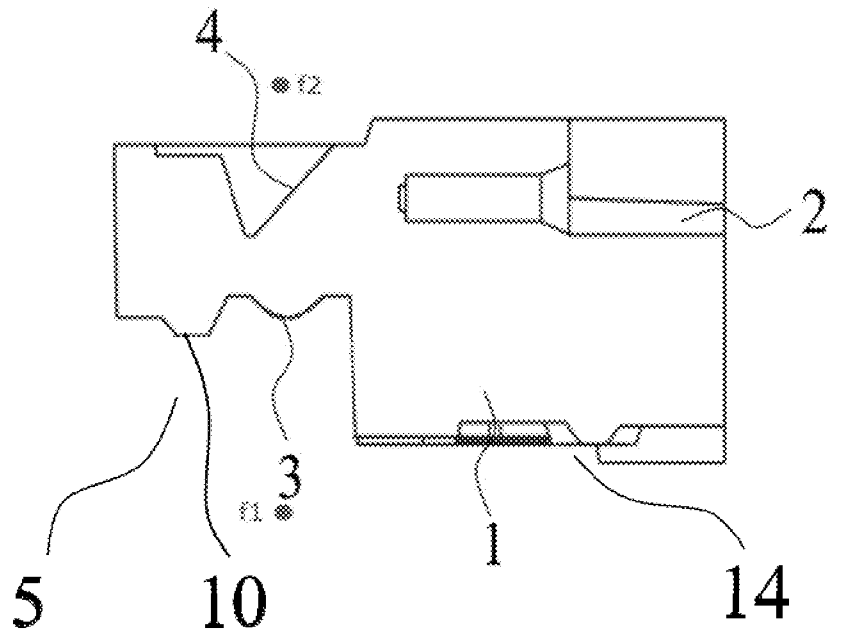
FIG. 2 is a schematic diagram of a sectional view structure of the optical assembly in some embodiments of the present application.

Further, the opening 5 in the present application further comprises a side wall extending along the first direction (in FIG. 2, the side wall is located at a right side of the lens 3). The opening 5 comprises a blocking member 10 extending towards the first direction, and the blocking member 10 is arranged on one side of the lens 3 facing away from a surface of the side wall, as shown in FIG. 2. When the photoelectric assembly 6 and the driving chip 7 are placed at the opening 5, there is an interval between the driving chip 7 and an inner wall of the opening 5. In order to prevent the photoelectric assembly 6 from being affected by dust outside the opening 5, the interval between the inner wall of the opening 5 and the driving chip 7 needs to be sealed. Usually, the interval between the driving chip 7 and the inner wall of the opening 5 is sealed with glue, and a large amount of glue is needed. However, the glue is easily immersed in the photoelectric assembly 6, which affects the optical signal transmission between the photoelectric assembly 6 and the lens 3. Therefore, in some embodiments of the present application the blocking member 10 extends toward the first direction at the opening 5, and the interval between the blocking member 10 and the driving chip 7 is reduced, so that the amount of glue is reduced, and the glue can be prevented from overflowing to the photoelectric assembly 6.

Further, as a preferred embodiment of the present application, the glue in the present application is black glue. The black glue has the characteristics of good bonding strength, insulation and the like, and the bonding strength of the driving chip 7 and the optical assembly can be ensured. Moreover, since the black glue is opaque, an influence of external optical signals on the photoelectric assembly 6 is effectively avoided, and effectiveness of signal transmission is ensured.

Further, as a preferred embodiment, an included angle between the reflecting surface 4 and an axis direction of the counter bore 2 in the present application is 45°. The included angle between the reflecting surface 4 and the axis direction of the included angle 2 is 45°, so that light emitted by the optical fiber placed at the counter bore 2 is reflected by the reflecting surface 4 and converged by the lens 3 to reach the photoelectric assembly 6.

Further, the body 1 in the present application is pervious to light at least on light transmission paths from the counter bore 2 to the reflecting surface 4 and from the lens 3 to the reflecting surface 4. In the present application, by replacing the mounting bracket structure with the body 1, the optical signals between the optical fiber and the photoelectric assembly 6 are transmitted inside the body 1, that is, the body 1 is a transmission carrier of the optical signals, so it is necessary to ensure that the optical signals can be transmitted normally on the paths from the counter bore 2 to the reflecting surface 4 and from the lens 3 to the reflecting surface 4. Alternatively, the body 1 is a light-transmitting material as a whole or a light-pervious material on the transmission path, and has a luminousness of 85% or more.

Further, the present application comprises a plurality of lenses 3 and a plurality of the counter bores 2, and the plurality of lenses 3 are arranged in one-to-one correspondence with the plurality of the counter bores 2. The rear focus of each lens of the plurality of lenses 3 arranged opposite to each other coincides with the image of the closed end of the counter bore 2 in the reflecting surface 4. When the optical signal transmission between the optical fiber and the photoelectric assembly 6 is realized through the optical assembly, the plurality of lenses 3 and the plurality of the counter bores 2 may be arranged along the third direction, the lenses 3 are arranged in one-to-one correspondence with the counter bores 2, and the reflecting surface 4 also extends in the third direction, so that the rear focus of the plurality of lenses 3 arranged opposite to each other coincides with the image of the closed end of the counter bore 2 in the reflecting surface 4.

Further preferably, the body 1 in the present application further comprises a notch 11, and at least part of the notch 11 is recessed towards the first direction to form the reflecting surface 4. The body 1 is in contact with the outside at one side of the reflecting surface 4 facing away from the lens 3. The reflecting surface 4 is formed by the body 1 being depressed along the first direction, and the reflecting surface 4 is formed by forming an inclined depression and coating a reflective material on the depression. Alternatively, the reflecting surface 4 may also be formed by a refractive index difference between the body 1 and the air.

Correspondingly, the notch 11 may be provided with a baffle 9, and the notch of the reflecting surface 4 is blocked by the baffle 9, so as to prevent glue or external dust from falling into the notch of the reflecting surface 4 and affecting a light reflection efficiency of the reflecting surface 4.

Figure 5:
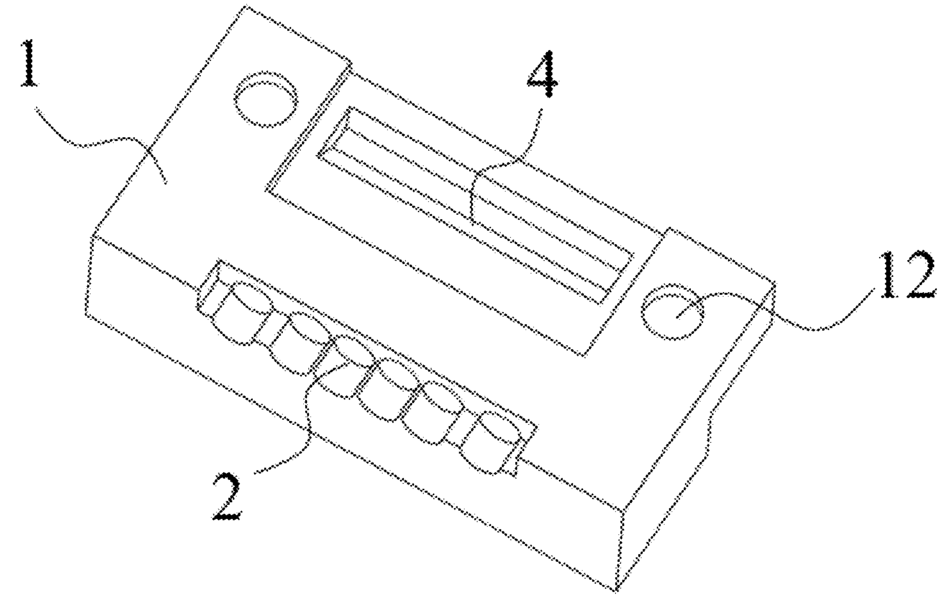
FIG. 5 is a schematic diagram of an overall structure of another optical assembly in some embodiments of the present application.

Preferably, the body 1 in the present application further comprises an optical alignment point 12. The optical alignment point 12 is arranged on the body along the first direction, which may be arranged on one side of the body 1 facing away from the lens 3 or on both sides of the body 1, as shown in FIG. 5. The optical alignment point 12 is transparent, and a user can see both sides of the body 1 through the optical alignment point 12. The optical alignment point 12 is mainly used for adjusting a positional relationship between the body 1 and other mounting parts. A mounting position of the body 1 is calibrated by the optical alignment point 12, and the optical alignment point 12 can be identified by using an automatic device, which is beneficial to automatic production of photoelectric module mounting.

Further, the present application further comprises a photoelectric module, which comprises the above-mentioned optical assembly and a photoelectric assembly 6, and a transceiver port of the photoelectric assembly 6 is arranged towards a lens 3. The photoelectric module further comprises a carrier plate 8. The optical assembly and the photoelectric assembly 6 are both arranged on the carrier plate 8. The photoelectric module is an assembly structure containing the optical assembly, and comprises the optical assembly, the photoelectric assembly 6 and the carrier plate 8. Specifically, the optical assembly is arranged on the carrier plate 8, and the carrier plate 8 seals the opening of the optical assembly along the first direction. The carrier 8 and the optical assembly form an accommodation space for the photoelectric assembly 6. The photoelectric assembly 6 is placed on the carrier plate 8, and the transceiver port of the photoelectric assembly 6 is arranged towards the lens 3.

Specifically, the photoelectric assembly 6 here is an optical receiver and/or an optical emitter. When a optical receiver is adopted as the photoelectric assembly 6, the corresponding optical fiber placed at the counter bore 2 is used for sending out optical signals. When a optical emitter is adopted as the photoelectric assembly 6, the corresponding optical fiber placed at the counter bore 2 is used for receiving optical signals. When the body 1 is provided with a plurality of lenses 3 and a plurality of the counter bores 2, the photoelectric assembly 6 corresponding to the lenses 3 may be an optical receiver and/or an optical emitter.

Specifically, the carrier board 8 is preferably a PCB board, and is indirectly and physically connected with the optical assembly. In the present application, the connection structure or the fixing structure is arranged on the carrier plate 8 to fix the optical assembly and the carrier plate 8 relatively, which is beneficial to the optical signal transmission between the photoelectric assembly 6 and the optical fiber.

Further, the transceiver port of the photoelectric assembly 6 coincides with a anterior focus of the lens 3. When the counter bore 2 of the body 1 is equipped with an optical fiber, in order to ensure stable transmission of optical signals between the photoelectric assembly 6 and the optical fiber, a position of the transceiver port of the photoelectric assembly 6 is adjusted so that the transceiver port of the photoelectric assembly 6 coincides with the anterior focus of the lens 3. In an actual setting process, a position of the photoelectric assembly 6 along the first direction may be adjusted to ensure the normal transmission of the optical signals between the photoelectric assembly 6 and the optical fiber.

Further, the body 1 in the present application is provided with a placement groove 14 along the second direction towards one side of the carrier plate 8. The carrier plate 8 abuts against the placement groove 14 along the second direction, and the carrier plate 8 at least partially coincides with a lower end face of the body 1 along the first direction. As a distance between the photoelectric assembly 6 and the lens 3 along the first direction needs to meet a transmission distance, in order to facilitate the position adjustment of the photoelectric assembly 6, the body 1 is provided with the placement groove 14 along the second direction towards one side of the carrier plate 8. When the body 1 is arranged on the carrier plate 8, a distance between the end face of the carrier plate 8 facing the lens 3 and the lens 3 along the first direction may be adjusted through the placement groove 14, and then the distance between the photoelectric assembly 6 placed on the carrier plate 8 and the lens 3 may be adjusted. Specifically, the carrier plate 8 comprises a substrate material and a copper foil portion covering the base material, but the copper foil does not completely cover the base material. The copper foil itself has a thickness. When the placement groove 14 of the carrier plate 8 directly straddles the part of the base material which is not covered with the copper foil portion, the distance between the lens 3 and the carrier plate 8 along the first direction is correspondingly changed, so that a distance between a transceiver end of the photoelectric assembly 6 on the carrier plate 8 and the lens 3 can be adjusted.

Further, the photoelectric module in the present application further comprises a driving chip 7, and the driving chip 7 is connected with the photoelectric assembly 6. The driving chip 7 is arranged on the carrier plate 8 and located in the opening 5, and at least part of the driving chip 7 extends out of the opening 5 along the second direction. The driving chip 7 is mainly used for controlling operation of the photoelectric assembly 6, and the driving chip 7 is connected with the photoelectric assembly 6 through a gold wire.

Further, the driving chip 7 in the present application and the photoelectric assembly 6 are arranged at intervals. The body 1 is provided with the opening 5 having an opening direction along the first direction, the second direction and a third direction, which makes it possible to place the driving chip 7 and the photoelectric assembly 6 in various ways. Alternatively, when the driving chip 7 and the photoelectric assembly 6 are arranged at intervals along the third direction, the driving chip 7 may be placed between the two photoelectric assemblies 6. When the driving chip 7 and the photoelectric assembly 6 are arranged at intervals along the second direction, the driving chip 7 may be arranged at one side of the photoelectric assembly 6 facing away from a side wall of the opening 5, and the driving chip 7 may also be arranged between the photoelectric assembly 6 and the side wall of the opening 5.

Further, the driving chip 7 in the present application and the photoelectric assembly 6 are arranged at intervals, the photoelectric assembly 6 is located at one side of the driving chip 7, and the carrier plate 8 is located at the other side of the driving chip 7. Alternatively, when the driving chip 7 and the photoelectric assembly 6 are arranged at intervals along the first direction, the photoelectric assembly 6, the driving chip 7 and the carrier plate 8 are arranged in sequence along the first direction, and in this case, a blocking structure needs to be arranged between the driving chip 7 and the photoelectric assembly 6 to achieve interval arrangement of the driving chip 7 and the photoelectric assembly 6.

Figure 6:
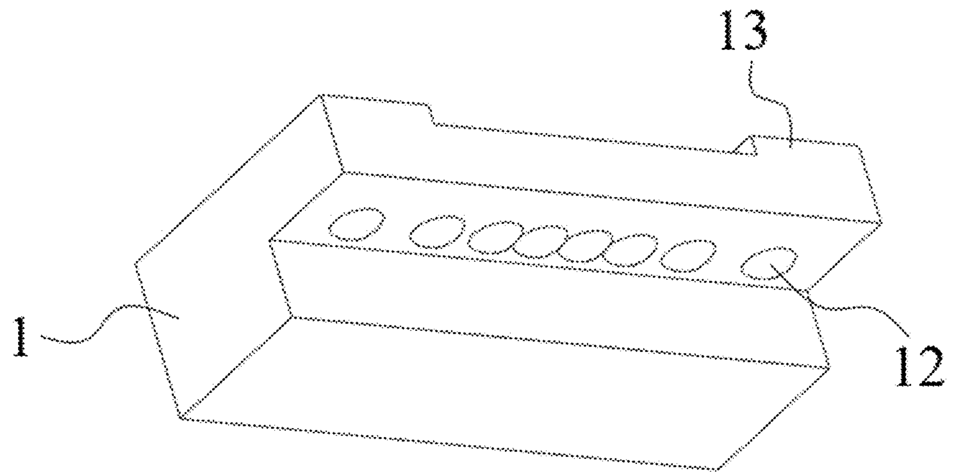
FIG. 6 is a schematic diagram of an overall structure of another optical assembly in some embodiments of the present application.

Further, the present application discloses another optical assembly structure, as shown in FIG. 6. One side of a fixing surface 13 of a glue blocking plate of the body 1 facing the driving chip 7 is provided with the glue blocking plate, the glue blocking plate is connected with the side wall of the body 1, and the glue blocking plate abuts against the driving chip 7 along the first direction. As there is an interval between the driving chip 7 and the inner wall of the opening 5, the driving chip 7 is covered with glue, and the opening 5 is sealed by the glue along the second direction. In order to further reduce an amount of glue and prevent the glue from overflowing to the transceiver port of the photoelectric assembly 6 along the second direction, the present application is provided with the glue blocking plate. The glue blocking plate is connected with the inner wall of the main body 1, and abuts against the driving chip 7 along the first direction. The inner wall of the opening 5 and the driving chip 7 can be scaled along the first direction only by sealing the abutment between the glue blocking plate and the driving chip 7 and the joint between the glue blocking plate and the body 1.

Further preferably, the driving chip 7 is covered with glue, and the side wall of the opening 5 is scaled by glue. In the present application, the driving chip 7 is covered with glue, and the opening 5 is enclosed and scaled along the first direction, the second direction and the third direction by glue, thus forming a closed accommodation space for the photoelectric assembly 6.

Further, the notch 11 is provided with a baffle 9, and the baffle 9 covers the reflecting surface 4. The baffle 9 is used for scaling one side of the reflecting surface 4 facing away from the lens 3, so as to prevent external dust from entering the groove of the reflecting surface 4. Specifically, the baffle 9 is located on a plane perpendicular to the first direction, and the baffle 9 is a plate-like structure extending along the second direction and the third direction. The notch 11 has a gap along the first direction, and the baffle 9 is accommodated at the gap and covers the reflecting surface 4.

Further, the present application further comprises a photoelectric module mounting method, comprising the following steps:

- selecting an optical assembly, a carrier plate 8, a photoelectric assembly 6 and a driving chip 7;
- placing the photoelectric assembly at a preset position of the carrier plate 8 and placing the driving chip 7;
- placing the optical assembly at the preset position of the carrier plate 8, and aligning a lens 3 of the optical assembly with a transceiver port of the photoelectric assembly 6 along a first direction; and
- scaling an interval between the driving chip 7 and the optical assembly along the first direction with glue.

Specifically, the carrier plate 8 is marked with positions of the optical assembly and the photoelectric assembly 6, and the initial positioning is completed by placing the optical assembly and the photoelectric assembly at the corresponding marked positions on the carrier plate 8. Because the alignment requirements of the optical assembly 6 and the lens 3 are high, when there is deviation, the optical path will be misaligned, which will lead to communication failure. Therefore, it is necessary to judge whether the above optical assembly and the photoelectric assembly 6 are installed in place.

Preferably, in the present application, before the sealing the interval between the driving chip 7 and the optical assembly along the first direction with glue, the method further comprises test steps, which are specifically as follows:

- observing an alignment condition between the optical assembly and a preset point on the carrier plate 8 through an optical alignment point 12, and judging a deviation between the optical alignment point 12 and the preset point on the carrier plate 8; and
- when the deviation between the optical alignment point 12 and the preset point on the carrier plate 8 is less than a standard deviation threshold, judging that the mounting of the optical assembly is qualified.
- when the deviation between the optical alignment point 12 and the preset point on the carrier plate 8 is greater than a standard deviation threshold, readjusting a position of the optical assembly on the carrier plate.

Here, it is judged whether the mounting of the photoelectric module is qualified or not by judging a deviation between a marking point on the carrier plate 8 and the optical alignment point 12, that is, a deviation degree between the optical alignment point 12 and the marking point.

Alternatively, in the present application, before the sealing the interval between the driving chip 7 and the optical assembly along the first direction with glue, the method further comprises a first step or a second step, which is specifically as follows:

the first step:

- arranging an optical fiber on one side of the reflecting surface 4 along a second direction;
- controlling, by the driving chip 7, the photoelectric assembly 6 to emit optical signals, which are converged by the lens 3, reflected by the reflecting surface 4 and transmitted to an end of the optical fiber to test an optical power received by the optical fiber;
- when the optical power received by the optical fiber is greater than or equal to the standard optical signal receiving intensity, judging that the mounting of the photoelectric module is qualified; and
- when the optical power received by the optical fiber is less than the standard optical signal receiving intensity, readjusting the position of the optical assembly on the carrier plate 8;

or the second step:

- arranging an optical fiber on one side of the reflecting surface 4 along the second direction, and arranging an optical emitter at one end of the optical fiber facing away from the reflecting surface;
- sending out, by the optical emitter, optical signals, which are transmitted to the reflecting surface 4 through the optical fiber and reflected to the lens 3, and converged by the lens 3, and transmitted to the transceiver port of the photoelectric assembly 6, to test an optical power received by the photoelectric assembly 6;
- when the optical power received by the photoelectric assembly 6 is greater than or equal to the standard optical signal receiving intensity, judging that the mounting of the photoelectric module is qualified; and
- when the optical power received by the photoelectric assembly 6 is less than the standard optical signal receiving intensity, readjusting the position of the optical assembly on the carrier plate 8. The present application can also adopt a real-time test mode to judge whether the mounting of the photoelectric module is qualified or not by detecting the optical signal transmission intensity between the photoelectric assembly and the optical fiber. Alternatively, whether the mounting of the photoelectric module is qualified or not can be judged here by testing optical transmission efficiency and transmission losses.

Further, the present application further comprises a plug, which comprises the above-mentioned photoelectric module and a connector. The connector is electrically connected with the carrier plate 8, and the connector is used for being electrically connected with an external device.

Further, the present application further comprises an active cable, which comprises two plugs mentioned above, and the two plugs are connected by an optical fiber.

Those skilled in the art can easily understand that those described above are merely preferred embodiments of the present application, but are not intended to limit the present application. Any modifications and equivalent substitutions made without departing from the principle of the present application shall all fall within the protection scope of the present application.

The invention claimed is:

1. An optical assembly, comprising:

a body, and a reflecting surface, an opening and a lens arranged on the body, wherein:

the opening and the lens are both arranged on one side of the reflecting surface along a first direction;

the opening comprises an inner wall, and the lens is arranged on the inner wall of the opening; and the opening faces the first direction and a second direction, and the second direction is different from the first direction;

the opening forms an accommodating region at the lens for accommodating a photoelectric assembly and a driving chip, and the opening allows at least part of the driving chip to extend out of the opening along the second direction;

the opening further comprises a side wall extending along the first direction, and the opening comprises a blocking member extending towards the first direction, and the blocking member is arranged on one side of the lens facing away from a surface of the side wall;

wherein one side of the body is provided with a counter bore, the reflecting surface is opposite to the counter bore along the second direction, and a rear focus of the lens coincides with an image of a closed end of the counter bore in the reflecting surface;

the counter bore comprises a fixing portion and a stop portion coaxially arranged in sequence along the second direction, the stop portion is arranged at the closed end of the counter bore, and a projection area of the stop portion along the second direction is smaller than a projection area of the fixing portion along the second direction.

2. The optical assembly according to claim 1, wherein an included angle between the reflecting surface and an axis direction of the counter bore is 45°.

3. The optical assembly according to claim 1, wherein the body is pervious to light at least on light transmission paths from the counter bore to the reflecting surface and from the lens to the reflecting surface.

4. The optical assembly according to claim 1, wherein the counter bore further comprises a guide portion, the guide portion is adjacent to the fixing portion, the stop portion is located at one end of the fixing portion, the guide portion is located at the other end of the fixing portion, the projection area of the fixing portion along the second direction is smaller than a projection area of the guide portion along the second direction, and the fixing portion comprises a truncated cone transition section with an inner diameter gradually increasing towards the guide portion.

5. The optical assembly according to claim 1, comprising a plurality of lenses and a plurality of the counter bores, wherein:

the plurality of lenses are arranged in one-to-one correspondence with the plurality of the counter bores, and the rear focus of each the lens of the plurality of lenses arranged opposite to each other coincides with the image of the closed end of the counter bore in the reflecting surface.

6. The optical assembly according to claim 1, wherein the body comprises a notch, and at least part of the notch is recessed towards the first direction to form the reflecting surface.

7. The optical assembly according to claim 1, wherein the body comprises an optical alignment point, and the optical alignment point is arranged on the body along the first direction.

8. A photoelectric module, comprising an optical assembly, a photoelectric assembly, a driving chip, and a carrier plate, wherein:

the optical assembly comprises a body, and a reflecting surface, an opening and a lens arranged on the body;

the opening and the lens are both arranged on one side of the reflecting surface along a first direction;

the opening comprises an inner wall, and the lens is arranged on the inner wall of the opening;

the opening faces the first direction and a second direction, and the second direction is different from the first direction;

a transceiver port of the photoelectric assembly faces the lens; and the optical assembly and the photoelectric assembly are both arranged on the carrier plate;

the driving chip is connected with the photoelectric assembly; and the driving chip is arranged on the carrier plate and located in the opening, and at least part of the driving chip extends out of the opening along the second direction;

the opening further comprises a side wall extending along the first direction;

the opening comprises a blocking member extending towards the first direction, and the blocking member is arranged on one side of the lens facing away from a surface of the side wall; and one side of the body facing the carrier plate is provided with a placement groove along the second direction, the carrier plate abuts against the placement groove along the second direction, and the placement groove at least partially coincides with the carrier plate along the first direction;

wherein one side of the body is provided with a counter bore, the reflecting surface is opposite to the counter bore along the second direction, and a rear focus of the lens coincides with an image of a closed end of the counter bore in the reflecting surface, and the counter bore is configured to fix an optical fiber such that an end face of the optical fiber coincides with the closed end of the counter bore; and the transceiver port of the photoelectric assembly coincides with a anterior focus of the lens.

9. The photoelectric module according to claim 8, wherein the driving chip and the photoelectric assembly are arranged at intervals, the photoelectric assembly is located at one side of the driving chip, and the carrier plate is located at the other side of under the driving chip;

an included angle between the reflecting surface and an axis direction of the counter bore is 45°; and the body is pervious to light at least on light transmission paths from the counter bore to the reflecting surface and from the lens to the reflecting surface.

10. The photoelectric module according to claim 8, wherein:

the counter bore comprises a fixing portion and a stop portion coaxially arranged in sequence along the second direction, the stop portion is arranged at the closed end of the counter bore, and a projection area of the stop portion along the second direction is smaller than a projection area of the fixing portion along the second direction;

the counter bore further comprises a guide portion, the guide portion is adjacent to the fixing portion, the stop portion is located at one end of the fixing portion, the guide portion is located at the other end of the fixing portion, the projection area of the fixing portion along the second direction is smaller than a projection area of the guide portion along the second direction, and the fixing portion comprises a truncated cone transition section with an inner diameter gradually increasing towards the guide portion;

the optical assembly comprises a plurality of lenses and a plurality of the counter bores;

the plurality of lenses are arranged in one-to-one correspondence with the plurality of the counter bores, and the rear focus of each the lens of the plurality of lenses arranged opposite to each other coincides with the image of the closed end of the counter bore in the reflecting surface; and the body comprises an optical alignment point, and the optical alignment point is arranged on the body along the first direction.

11. The photoelectric module according to claim 8, wherein the driving chip is covered with glue, and the glue seals the opening along the second direction.

12. The photoelectric module according to claim 8, wherein the body comprises a notch, and at least part of the notch is recessed towards the first direction to form the reflecting surface; and the notch is provided with a baffle, and the baffle covers the reflecting surface.

13. An active cable, comprising two plugs, the two plugs being connected by an optical fiber; and each plug comprising a photoelectric module and a connector, wherein:

the photoelectric module comprises an optical assembly, a photoelectric assembly, a driver chip, and a carrier plate;

the optical assembly comprises a body, and a reflecting surface, an opening and a lens arranged on the body;

the opening and the lens are both arranged on one side of the reflecting surface along a first direction;

the opening comprises an inner wall, and the lens is arranged on the inner wall of the opening;

the opening faces the first direction and a second direction, and the second direction is different from the first direction;

a transceiver port of the photoelectric assembly faces the lens; and the optical assembly and the photoelectric assembly are both arranged on the carrier plate, and the connector is electrically connected with the carrier plate;

the driving chip is connected with the photoelectric assembly; and the driving chip is arranged on the carrier plate and located in the opening, and at least part of the driving chip extends out of the opening along the second direction;

the opening further comprises a side wall extending along the first direction;

the opening comprises a blocking member extending towards the first direction, and the blocking member is arranged on one side of the lens facing away from a surface of the side wall; and one side of the body facing the carrier plate is provided with a placement groove along the second direction, the carrier plate abuts against the placement groove along the second direction, and the placement groove at least partially coincides with the carrier plate along the first direction;

wherein one side of the body is provided with a counter bore, the reflecting surface is opposite to the counter bore along the second direction, a rear focus of the lens coincides with an image of a closed end of the counter bore in the reflecting surface, and the counter bore is configured to fix the optical fiber such that an end face of the optical fiber coincides with the closed end of the counter bore.

* * * * *